United States Patent Office 3,360,754
Patented Dec. 26, 1967

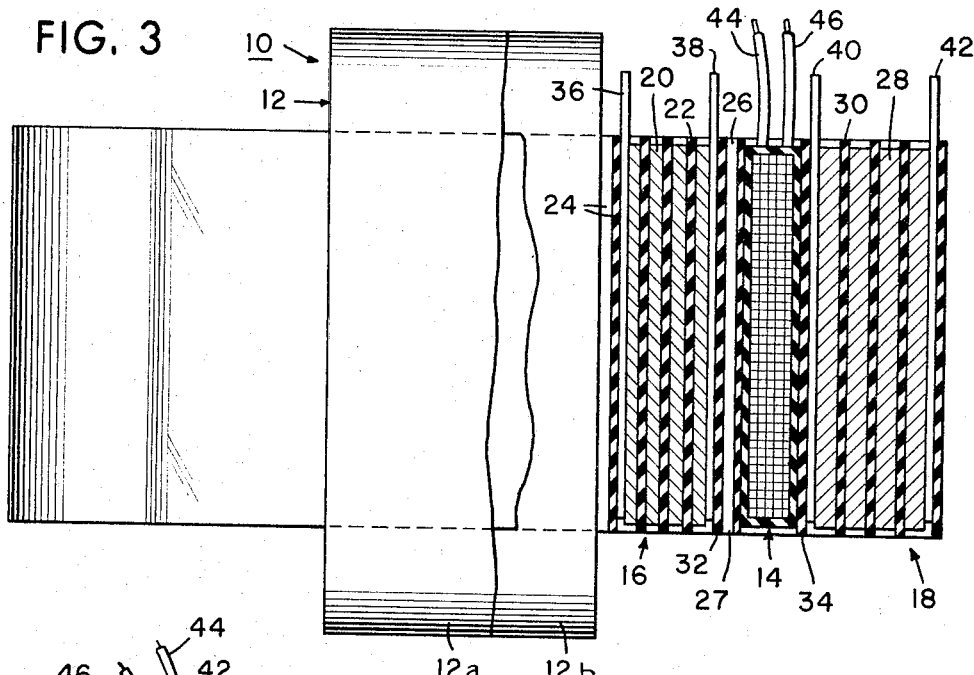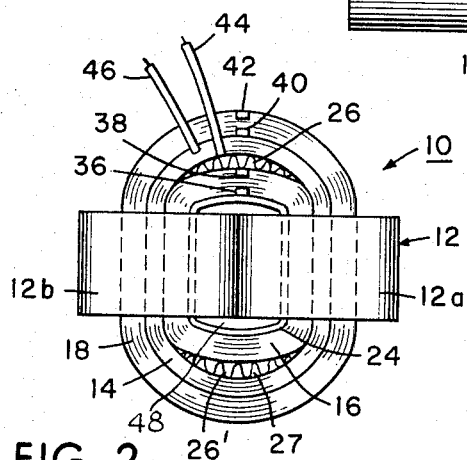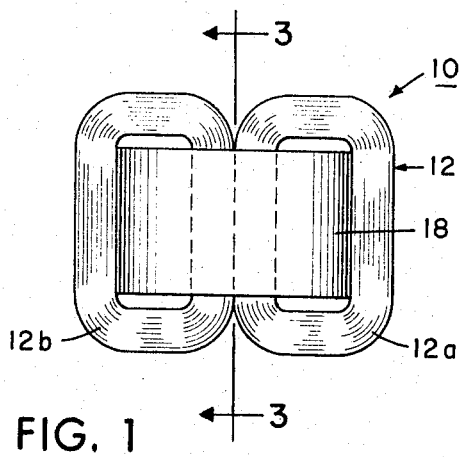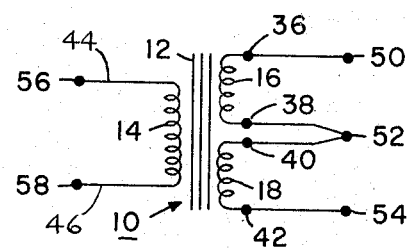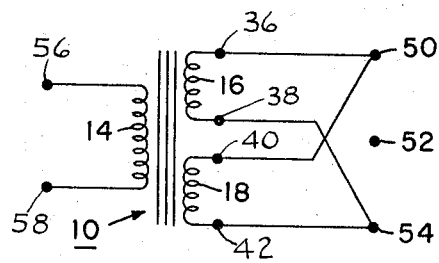
INVENTOR
WILLIS F. GERDIMAN

3,360,754
TRANSFORMER HAVING REDUCED DIFFERENTIAL IMPEDANCES BETWEEN SECONDARY PORTIONS
Willis F. Gerdiman, St. Ann, Mo., assignor to Wagner Electric Corporation, St. Louis, Mo., a corporation of Delaware
Filed June 29, 1965, Ser. No. 467,985
9 Claims. (Cl. 336—170)

This invention relates to electrical inductive apparatus and more particularly to electrical inductive apparatus having windings adapted for interconnection in either series or parallel relationship.

Distribution transformers, for example, are generally provided with a pair of secondary windings with one end of each connected to one low voltage bushing terminal and the other ends connected respectively to two other low voltages bushing terminals. In this way, the two secondary windings are connected in series between two of the bushing terminals such that the three bushing terminals can be connected to supply power to a three-wire multiple-voltage load circuit such as a 120/240 volt circuit. While it would be ideal to have the impedances of the two secondary windings equal, the impedance of one secondary winding can be considerably different from that of the other, within limits, without seriously affecting the performance of the transformer when the secondary windings are connected in series with each other for three-wire electric service. However, so that the two secondary windings of the transformer can be connected in parallel with each other when desired and thus supply electric power to a single-voltage load circuit at double the current rating of one winding alone, the impedances of the two secondary windings must not differ too greatly from one another in order to prevent one secondary winding from carrying a much greater portion of the total load current.

In the past, in attempting to obtain secondary windings having equal or balanced impedances, the two secondary windings usually included four secondary coils each concentrically arranged with the primary winding on the transformer core. Two of the coils were disposed on the radially inner side of the primary and the other two coils on the radially outer side of the primary. With this arrangement, the resistances and leakage reactances of the four concentric coils differed because of the differences, for example, in the lengths of the mean turns of the coils and in the relative positions thereof with respect to the primary winding; thus, the impedances of the four coils differed. The coils were interconnected, however, such that each secondary winding included one of the relatively low impedance coils and one of the relatively high impedance coils connected in series relationship so that the effective impedances of the two windings were close enough in value for parallel operation of the two windings.

There are, however, certain disadvantages connected with transformers of the above type; for example, they require at least four separately wound secondary coils and eight coil end terminals for the four coils. The labor time and cost of winding and handling the four separate coils and providing the numerous coil end terminals result in relatively high manufacturing costs. In the manufacture of foil-wound transformers, that is, one having a coil formed from a concentrically wound insulated metal foil or sheet having a width equal to the axial height of the coil, each coil end terminal generally extends substantially across the width of the foil or from one side edge to the other in order to obtain a more uniform coil configuration and a more uniform current density in the foil layer adjacent the terminal. Each such end terminal is usually connected to a coil end by heating the terminal and foil layer to a relatively high temperature, applying silver solder or the like to join the terminal and layer, and then waiting for the terminal and layer to cool to permit subsequent handling thereof. Thus, the manufacturing costs involved in forming the numerous foil-wound coils and end terminals therefore are relatively high.

It is therefore an object of the present invention to provide a novel electrical inductive apparatus wherein the above-mentioned disadvantages, to a large measure, are overcome.

Another object is to provide a novel transformer having a pair of windings concentrically disposed on the transformer core which can be interconnected either for series or parallel operation and which require relatively fewer separate coils and coil end terminals.

Another object is to provide a transformer having a pair of concentric windings wherein the impedances of the windings are sufficiently close in value to permit effective parallel operation thereof without requiring the division of each winding into separate coils.

Another object is to provide a transformer having a primary winding and a pair of secondary windings mounted on a transformer core with the secondary windings disposed concentrically on opposite sides of the primary winding wherein the impedances of the secondary windings are substantially equal so that the secondary windings can be connected in parallel with each other for supplying power to a load circuit while obtaining a substantially equal division of load current between the secondary windings.

Another object is to provide a novel transformer having a primary winding and a pair of foil-wound windings disposed respectively on opposite sides of the primary winding wherein the foil-wound windings have impedance values which permit them to be connected for effective parallel operation.

Still another object is to provide a novel foil-wound type transformer having a first winding, and a pair of single-coil, foil-wound windings concentrically disposed on opposite sides of the first winding and inductively associated therewith wherein the impedances of the foil-wound windings are substantially equal.

These and other objects and advantages of the present invention will become apparent hereinafter.

Briefly, in accordance with the present invention, an electrical inductive apparatus is provided having a first winding and a pair of windings disposed respectively on the radially opposite sides of the first winding in inductive relation therewith and with the radially outermost winding having a predeterminately lower resistance per unit length of turn than that of the radially innermost winding such that the impedances of the pair of windings are close enough in value to permit effective parallel operation thereof.

In the drawing which illustrates an embodiment of the invention,

FIG. 1 is a front elevational view of a transformer according to the present invention, FIG. 2 is a top plan view of the transformer of FIG. 1, FIG. 3 is a greatly enlarged partial section taken along the line 3—3 of FIG. 1, FIG. 4 is a schematic connection diagram showing the transformer of FIGS. 1–3 with the secondary windings thereof interconnected to supply power to a multiple-voltage, three-wire circuit, and FIG. 5 is a schematic connection diagram showing the transformer of FIGS. 1–3 with the secondary windings thereof connected together in parallel relation for supplying power to a single-voltage, two-wire circuit.

Referring now to the drawings and particularly to FIGS. 1, 2 and 3, a transformer 10, such as a distribution transformer, includes a magnetic core 12 having a pair of core sections 12a and 12b forming a three-legged or shell-type core, a primary winding 14 and a pair of secondary windings 16 and 18.

Each of the secondary windings 16 and 18 is shown as a foil-wound coil, each secondary being a single-coil winding. The three winding coils 14, 16 and 18 surround the middle leg of core 12 and are concentrically disposed with the secondary coil 16 disposed on the radially inner side of primary coil 14, and the secondary coil 18 disposed on the radially outer side of the primary coil 14.

As seen in FIG. 3, coil 16 is shown consisting of a plurality of spiral-wound concentric turns of a sheet of metal foil 20, such as copper or aluminum, of predetermined cross-sectional area with the adjacent turns insulated by a sheet 22 of insulating material, such as paper. The coil 16 may be formed by simultaneously winding sheet 20 and insulating sheet 22 onto an insulating coil form 24.

Coil spacers 26, 26' of insulating material, such as sheets of corrugated fiber, are disposed adjacent opposite sides of secondary coil 16 and provide axially extending fluid flow passages or ducts 27 between primary coil 14 and secondary coil 16 for cooling purposes. For example, when the transformer 10 is disposed in a transformer tank (not shown) and the tank filled with an insulating liquid (not shown), the liquid flows through the ducts 27 to provide efficient cooling.

The outer secondary coil 18 consists of a plurality of concentric turns of a sheet of metal foil 28, such as a sheet of copper or aluminum, of predetermined cross-sectional area with the adjacent turns insulated from each other by a sheet 30 of insulating material, such as paper, which may be wound simultaneously with the sheet 28.

Each of the secondary coils has the same number of turns, and it will be assumed herein that the foil sheets 20 and 28 of the coils are formed from the same kind of metal; however, it will be apparent that foil sheets of different kinds of metals may be used in the same transformer, if desired.

The insulating sheets 22 and 30 of secondary coils 16 and 18 are wider than their associated metal foils 20 and 28 so that the insulating sheets extend beyond the side edges of the foils to insure against arcing between side edges of adjacent turns of the foils.

As seen in FIG. 3, coil insulation, indicated at 32, is provided between the primary coil 14 and the inner secondary coil 16 which may consist of one or more layers of paper wrapped around the periphery of the coil 16. Coil insulation between the primary coil 14 and outer secondary coil 18 is indicated at 34 which may also consist of one or more layers of paper surrounding primary coil 14.

Coil 16 has a terminal 36 secured to the inside or radially inner coil end of the foil 20 and a terminal 38 secured to the outside or radially outer coil end thereof. Similarly, coil 18 has a terminal 40 secured to foil 28 at the radially inner coil end and a terminal 42 secured to the radially outer coil end thereof. Each of the end terminals 36, 38, 40 and 42 is shown as an axially extending metal bar, such as a copper bar, which extends beyond the upper side edges of the coils to provide a lead connection. Each of these end terminals extends substantially across the entire width of the foil to which it is secured. Each of these end terminals may be soldered or brazed in any suitable or conventional manner to its associated foil.

The primary winding 14 is indicated in FIG. 3 as being of the wire-wound type, although it could be of the foil-wound type. The primary winding 14 is provided with end leads 44 and 46 which may be connected to high voltage bushing terminals.

The windings 14, 16 and 18 are shown as pre-formed coils, and the core 12 as a wound-type core having a plurality of flat-wise nested turns or laminations of magnetic strip material. The core 12 and windings 14, 16 and 18 may be assembled together in any suitable manner, for example, by lacing successive sections of the strip material of core 12 through the window 48 of the winding 16.

FIG. 4 diagrammatically illustrates the transformer 10 connected to supply a multiple-voltage circuit, such as a 120/240 volt distribution circuit. In FIG. 4, there are shown three secondary transformer bushing terminals 50, 52 and 54 connected to the secondary windings 16 and 18, and a pair of primary bushing terminals 56 and 58 connected to primary winding 14. Coil end terminals 36 and 38 are connected respectively to bushing terminals 50 and 52, end terminal 40 is connected to bushing terminal 52, and end terminal 42 is connected to bushing terminal 54.

While it is desirable that the impedances of the radially inner secondary winding coil 16 and the radially outer secondary winding coil 18 be of equal value when connected in series with each other, as in the connection arrangement of FIG. 4, the impedance values of the two second winding coils may differ from each other, within limits, by a considerable amount with little adverse effects on the transformer performance. However, if the secondary windings 16 and 18 are to be connected for parallel operation, such as indicated in the circuit of FIG. 5, the impedances of these secondary windings must be close enough in value so as to obtain an adequate or practical division of load current between the secondary windings, or, in other words, to prevent one of the secondary windings from carrying an undesirably greater amount of current than the other during operation.

The impedance of a secondary winding coil in any given transformer depends, of course, upon the leakage reactance and resistance values of the coil. The leakage reactance is affected by such factors as the spacing or effective gaps between the primary and secondary coils, and the length of the mean turn of the coil; and the resistance value is affected also by the length of the mean turn of the coil. Since the length of the mean turn in a radially outer secondary winding coil is much greater than that of a radially inner secondary coil, the radially outer coil would normally have a much greater resistance, for example, 50% greater, than that of the radially inner coil where the resistance per unit length of turn of each is the same. Also, with normal insulation and with the usual cooling ducts, the leakage reactance between the primary and a radially outer coil would usually be greater than that between the primary and radially inner coil because of the difference in the lengths of the mean turns of the two secondary coils.

The secondary coils 16 and 18 of transformer 10 are formed to provide a predetermined ratio between the resistance values thereof which results in the secondary coils having substantially equal impedances or impedance values which are close enough in value to permit connection of the secondary coils for parallel operation. This is accomplished by forming these coils such that the radially outer secondary coil 18 has a resistance per unit length of turn predeterminately less than that of the radially inner secondary coil 16. As seen in FIG. 3, the metal foil 28 used in forming the outer secondary coil 18 has a greater cross-sectional area than metal foil 20 which is used in forming the inner secondary coil 16; thus, the resistance per unit length of turn of the outer coil 18 is less than that of inner coil 16. The particular ratio of the resistances of the inner and outer secondary coils necessary to effect substantially equal coil impedances or impedances sufficiently close in value for a given transformer, depends upon such things as the type of coil construction, coil spacing, size and location of cooling ducts, amount of insulation, and k.v.a. rating of the transformer.

If the resistance of the radially outer secondary coil 18 was made substantially equal to the resistance of the radially inner coil 16 and the reactance values of the two secondary coils were the same, then the impedances, of course, would be equal and the load current would divide equally between the two secondary coils during operation of the transformer when connected as shown in FIG. 5. Since the radially outer secondary coil 18 has a greater mean diameter than the radially inner secondary coil 16, the reactance between the primary coil 14 and the outer secondary coil 18 will usually be somewhat greater than that between the primary coil 14 and the inner secondary coil 16 unless the effective gap between the primary 14 and radially inner coil 16 is made large enough to effect equal reactances of the two secondary coils 16 and 18. In cases where the reactance of the radially outer secondary coil 18 is greater than that of the radially inner secondary coil 16, which will usually be the case, the two secondary coils can be formed from foils having predeterminately different per unit length resistance values such that the resistance of the inner secondary coil 16 is greater than that of the outer secondary coil 18 by an amount that will substantially compensate for the difference in the reactances of the two secondary coils to provide substantially equal impedances. By increasing the reactance between the primary and secondary coils 14 and 16, such as by increasing the effective gap therebetween, for example, increasing the size of the cooling ducts 26, 26′, the difference between the resistance per unit length of turn values of the two secondary coils 16 and 18 required to obtain substantially equal impedance values may be reduced.

One distribution transformer made in accordance with the present invention had a 25 k.v.a. rating with a voltage rating of 7200 primary volts to 120/240 secondary volts. The radially inner and outer concentric secondary coils had 17 turns each and were formed of aluminum sheet or foil having a width dimension of 4½ inches. The aluminum foil of the radially inner secondary coil was .020 inch thick and that of the foil of the radially outer secondary coil was .032 inch thick. The layer insulation used between turns for each of the secondary coils had a thickness of .004 inch. The coil insulation or low voltage to high voltage insulation was .184 inch thick, and two corrugated spacers each 5⅝ inches wide providing about ¼ inch gap between the opposed sides of the inner secondary coil and the primary coil were used. The length of the mean turn of the primary coil was about 31.3 inches and that of the inner and outer secondary coils were about 24.36 inches and 38.2 inches, respectively.

With the above-described example transformer construction, the resistances of the two secondary coils were substantially equal, the resistance of the outer secondary coil being about 49.5% of the sum of the resistances of both secondary coils while the resistance of the inner secondary coil was about 50.5% of the sum of the resistances of the two secondary coils, the inner secondary resistance being only slightly greater than the outer secondary coil resistance. With the secondary coils connected for parallel operation, good division of current between the coils was obtained. The outer secondary coil carried about 48% of the total current, while the inner secondary coil carried about 52% of the total current, thus indicating that impedances of the two secondary coils were substantialy equal.

Since the foil in the radially inner secondary coil of the above example transformer was .020 inch thick and the foil in the radially outer coil was .032 inch thick, the cross-sectional area of the outer coil foil was 60% greater than the inner coil foil so that the inner coil foil had a 60% greater resistance per unit length than that of the outer coil. In this case, the inner coil carried only about 4% of the total current more than the outer coil to provide a practical division of current for effective parallel operation. Depending on the expected loading conditions, the secondary windings obviously may be constructed for a particular transformer such that one secondary coil carries a still greater proportion of the total current than the other and yet the division of current may be adequate for effective parallel operation of the coils. For example, in some cases the foil for the inner secondary coil may be formed of foil having a greater resistance per unit length than that of the outer coil by such an amount that one of the secondary coils carries as high as 20% of the total current more than the other and yet be a practical division of current for the particular application or load. Generally, the resistance per unit length of the foil used in the inner secondary coil should be at least 20% greater than that of the outer coil foil to produce a transformer that will provide a practical division of current between the secondary coils.

It will thus be apparent that a transformer having a pair of secondary coils on radially opposite sides of the primary coil can be readily made so that the secondary coils can be connected for effective parallel operation by forming the secondary coils so that the outer coil has a substantially lower resistance per unit length of turn than that of the inner secondary coil to obtain impedances which are sufficiently close in value to afford effective parallel operation.

Since each of secondary winding coils 16 and 18 of transformer 10 is a single-coil winding and only four end terminals are required, it will be obvious that the transformer 10 is especially simple and relatively inexpensive to manufacture.

Instead of using separate layers of insulation between the turns of a coil, the turns may be provided with other suitable insulating materials; for example, the metal foil sheet may be coated with a suitable insulating resin or varnish. Also, in some cases it may be desired to wind more than one metal foil sheet in forming single-coil windings so that each effective turn will include plural layers of metal foil. In such a case, the plural sheets may be in electrical contact with each other and/or have their inner ends electrically connected together and their outer ends electrically connected together to form a single-coil winding with multiple layer turns.

In the manufacture of polyphase transformers, such as three-phase transformers, three transformers, each constructed like the single-phase transformer 10, may be interconnected to provide a three-phase transformer arrangement. Also, if it is desired to manufacture a three-phase transformer, for example, one utilizing a three-phase magnetic core instead of three single-phase cores, each winding leg of the three-phase core can be provided with a set of windings constructed and related like the winding coils 14, 16 and 18. In this way, the secondary winding coils of each phase may be connected for series or parallel operation since they will have substantially equal impedance values or impedances close enough in value for effective parallel operation.

From the foregoing, it is now apparent that a novel transformer meeting the objects set out hereinbefore is provided. It is to be understood that changes and modifications to the form of the invention set forth in the disclosure by way of illustration may be made by those skilled in the art without departing from the true spirit and scope of the invention as defined by the claims which follow.

The embodiments of the invention in which an exclusive property or privilege is claimed are defined as follows:

1. A distribution transformer comprising a magnetic core having a winding receiving core leg, a primary winding coil surrounding said core leg and having connection means for connecting said primary coil to power supply means, first and second secondary winding coils surrounding said core leg in inductive concentric relation with said primary winding coil and disposed respectively on radially inner and outer sides thereof, each of said secondary coils having substantially an equal number of conductor turns so the substantially equal voltages are induced therein when said primary winding coil is connected to said supply means, and means including connection means on each of said secondary coils for selectively connecting said secondary coils in series circuit relation with each other to provide a voltage across said secondary coils substantially equal to twice the voltage induced in one of said secondary coils and in parallel circuit relation with each other to provide a voltage across said secondary coils substantially equal to the voltage induced in one of said secondary coils, said first and second secondary coils having first and second predetermined resistance per unit length of turn values, respectively, said values being in a predetermined ratio in which said first value is predeterminately greater than said second value to reduce the differential between the impedance values of said secondary coils.

2. The distribution transformer according to claim 1, wherein said first value is at least 20 percent greater than said second value.

3. The distribution transformer according to claim 2, wherein said conductor turns of at least one of said one and other secondary coils comprise turns of metal foil having a width substantially equal to the height of said one of said one and other secondary coils.

4. The distribution transformer according to claim 1, wherein said first value is about 60 percent greater than said second value.

5. The distribution transformer according to claim 1, wherein said first secondary coil has a total resistance at least as great as that of said second secondary coil.

6. The distribution transformer according to claim 1, wherein the cross-sectional area of each of the conductor turns of said second secondary coil is greater than the cross-sectional area of each of the conductor turns of said first secondary coil.

7. The distribution transformer according to claim 6, wherein said first named cross-sectional area is about 60 percent greater than said last named cross-sectional area.

8. The distribution transformer according to claim 1, comprising at least three transformer bushing terminals, and said connection means including a pair of coil end terminals for each of said secondary coils, one of said end terminals of each of said pairs being connected to one of said bushing terminals and the other of said end terminals of each of said pairs being connected to the other two of said bushing terminals, respectively, when said secondary coils are connected in said series circuit relation.

9. The distribution transformer according to claim 8, wherein said conductor turns of said secondary coils comprise turns of metal foils having a width substantially equal to the height of said secondary coils, respectively, and the cross-sectional area of the metal foil of said second secondary coil being greater than that of the metal foil of said first secondary coil so that said first value is at least 20 percent greater than said second value.

References Cited

UNITED STATES PATENTS

| | | | |
|---|---|---|---|
| 851,467 | 4/1909 | Wood | 336—186 |
| 1,945,544 | 2/1934 | Conklin | 336—224 |
| 2,710,947 | 6/1955 | Gaston | 336—223 X |
| 2,735,979 | 2/1956 | Coben | 336—223 X |
| 2,962,600 | 11/1960 | Preininger | 336—170 X |
| 3,200,357 | 8/1965 | Olsen et al. | 336—205 |

LARAMIE E. ASKIN, *Primary Examiner.*

T. J. KOZMA, *Assistant Examiner.*

UNITED STATES PATENT OFFICE

CERTIFICATE OF CORRECTION

Patent No. 3,360,754                         December 26, 1967

Willis F. Gerdiman

It is hereby certified that error appears in the above numbered patent requiring correction and that the said Letters Patent should read as corrected below.

Column 2, line 6, for "therefore" read -- therefor --; column 5, line 41, for "5 5/6" read -- 5 5/8 --; column 6, line 74, for "the" read -- that --.

Signed and sealed this 11th day of March 1969.

(SEAL)
Attest:

Edward M. Fletcher, Jr.                         EDWARD J. BRENNER
Attesting Officer                                  Commissioner of Patents